D. WIGGER.
Axle and Axle-Box.
No. 70,928.
Patented Nov. 12, 1867.
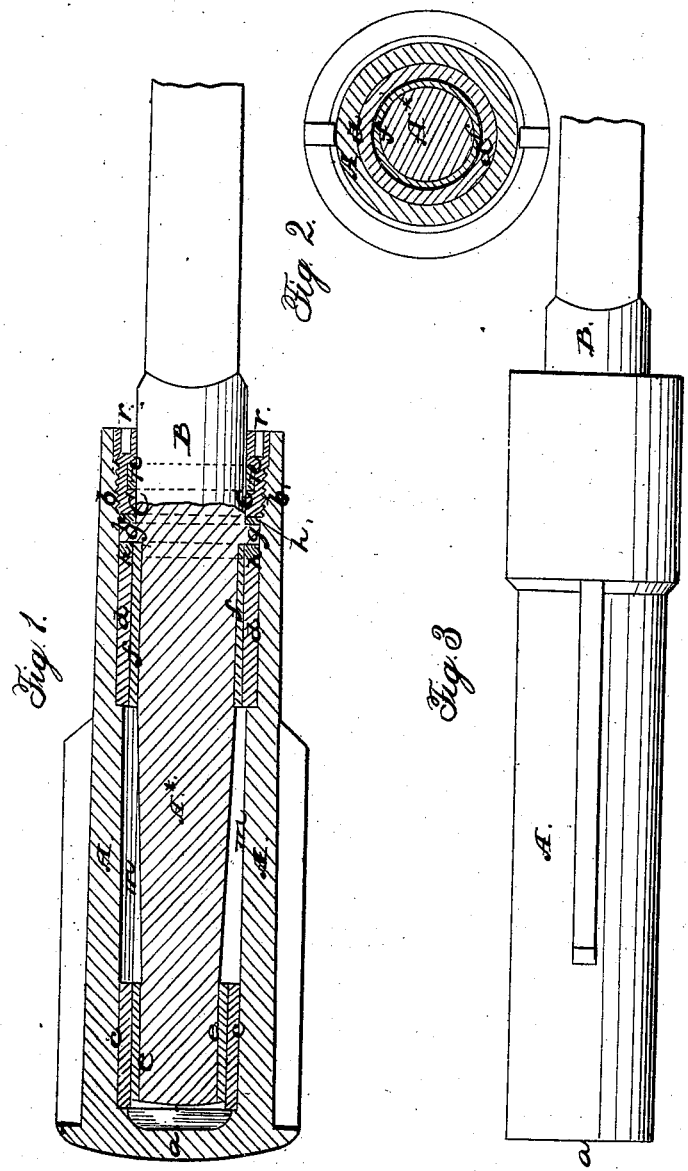

United States Patent Office.

DAVID WIGGER, OF NEW YORK, N. Y.

Letters Patent No. 70,928, dated November 12, 1867.

IMPROVEMENT IN AXLES AND AXLE-BOXES.

The Schedule referred to in these Letters Patent and making part of the same.

TO ALL WHOM IT MAY CONCERN:

Be it known that I, DAVID WIGGER, of the city, county, and State of New York, have invented certain new and useful Improvements in Axles and Axle-Boxes; and I do hereby declare that the following is a full, clear, and exact description of the same, reference being had to the accompanying drawings, making a portion of this specification, in which—

Figure 1 is a longitudinal section of an axle and axle-box constructed according to my invention.

Figure 2 is a transverse section of the same.

Figure 3 is a side view, showing a modified form of the same.

Similar letters of reference indicate corresponding parts in all the figures.

This invention consists in an axle-box, closed at its outer end, and provided at its inner extremity with an annular nut, in combination with the flanched journal of the axle; and it consists in the adaptation of anti-friction rings to both box and axle, and in a novel arrangement of packing-rings, whereby the retention of the lubricating material within the box is more effectually provided for.

To enable others to understand the construction and operation of my invention, I will proceed to describe it with reference to the drawings.

A represents the axle-box, made preferably of cast iron, and formed either as shown in fig. 1, to be driven into the central hole or slot of the hub from the outer side or end of the said hub, or as indicated in fig. 2, in which latter case it should be placed in the hub from the inner end thereof. The outermost extremity $a$ of the box A is closed, and the inner or open end thereof is furnished with an internal screw-thread, as shown at $b$. Fitted within the axle-box, one near each end thereof, are two rings, $c\ d$, of hardened steel. The journal $A^\times$ of the axle B is furnished with two hardened steel collars $e\ f$, which work within the rings $c\ d$, as indicated in fig. 1, and the entire wearing-surface being limited to the said rings and collars, it follows that the friction is reduced very materially, and from the hardness of the said surfaces of the collars and rings the said parts are rendered extremely durable. Provided upon the inner portion of the journal $A^\times$, is an annular flanch, $g$, upon either side of which is placed a packing-ring, $h$, and at the inner side of which, upon the adjacent cylindrical portion of the axle, is an annular nut, C, which screws into the internal screw $b$, in the inner end of the axle-box A, in such manner that by holding against the flanch $g$, the said nut effectually prevents the box from slipping or moving off the journal, the packing-rings $h$ serving to more effectually prevent the escape of the lubricating material placed in a receptacle, formed as shown at $m$, within the box and around the central portion of the journal, such prevention of the escape of the oil being furthermore assisted by another packing-ring, provided in the interior of the nut C, as shown at $n$. It should be mentioned that the aforesaid nut is intended to be turned, when required, by means of a wrench, furnished with studs or spurs, which fit into holes or recesses $r$, provided in the outer side of the said nut.

What I claim as my invention, and desire to secure by Letters Patent, is—

1. The rings $c\ d$, fitted within the journal-box, in combination with the collars $e\ f$, on the journal $A^\times$, substantially as and for the purpose specified.

2. The arrangement of the packing-ring $n$, within the annular nut C, and in relation with the journal $A^\times$, packing-rings $h$, and flanch $g$, substantially as and for the purpose specified.

DAVID WIGGER.

Witnesses:
A. LE CLERC,
CHAS. H. ASHTON.